(12) United States Patent
Jung et al.

(10) Patent No.: US 9,639,481 B2
(45) Date of Patent: *May 2, 2017

(54) SYSTEMS AND METHODS TO MANAGE CACHE DATA STORAGE IN WORKING MEMORY OF COMPUTING SYSTEM

(71) Applicant: PernixData, Inc., San Jose, CA (US)

(72) Inventors: Woon Ho Jung, Cupertino, CA (US); Nakul Dhotre, Santa Clara, CA (US)

(73) Assignee: PernixData, Inc., San Jose, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/609,085

(22) Filed: Jan. 29, 2015

(65) Prior Publication Data

US 2016/0041927 A1 Feb. 11, 2016

Related U.S. Application Data

(63) Continuation-in-part of application No. 14/455,090, filed on Aug. 8, 2014.

(51) Int. Cl.

| G06F 12/08 | (2016.01) |
|---|---|
| G06F 12/12 | (2016.01) |
| G06F 12/128 | (2016.01) |
| G06F 12/122 | (2016.01) |
| G06F 12/0864 | (2016.01) |
| G06F 12/0871 | (2016.01) |
| G06F 12/0897 | (2016.01) |
| G06F 12/123 | (2016.01) |

(52) U.S. Cl.
CPC ........ *G06F 12/128* (2013.01); *G06F 12/0864* (2013.01); *G06F 12/0871* (2013.01); *G06F 12/122* (2013.01); *G06F 12/0897* (2013.01); *G06F 12/123* (2013.01); *G06F 2212/151* (2013.01); *G06F 2212/62* (2013.01); *G06F 2212/69* (2013.01)

(58) Field of Classification Search
CPC ...................... G06F 12/0897; G06F 2212/151
See application file for complete search history.

(56) References Cited

U.S. PATENT DOCUMENTS 7,281,087 B2 * 10/2007 Kuwata ............... G06F 12/0873
                                                                    711/113
8,006,061 B1    8/2011 Chatterjee et al.
(Continued)

*Primary Examiner* — Charles Rones
*Assistant Examiner* — Tian-Pong Chang
(74) *Attorney, Agent, or Firm* — Gard & Kaslow LLP

(57) ABSTRACT

Systems and methods for managing records stored in a storage cache are provided. A cache index is created and maintained to track where records are stored in buckets in the storage cache. The cache index maps the memory locations of the cached records to the buckets in the cache storage and can be quickly traversed by a metadata manager to determine whether a requested record can be retrieved from the cache storage. Bucket addresses stored in the cache index include a generation number of the bucket that is used to determine whether the cached record is stale. The generation number allows a bucket manager to evict buckets in the cache without having to update the bucket addresses stored in the cache index. In an alternative embodiment, non-contiguous portions of computing system working memory are used to cache data instead of a dedicated storage cache.

13 Claims, 15 Drawing Sheets

(56) References Cited

U.S. PATENT DOCUMENTS

| | | |
|---|---|---|
| 8,255,660 B1 | 8/2012 | Chatterjee et al. |
| 8,397,028 B2 | 3/2013 | Spackman |
| 8,812,811 B1 | 8/2014 | Chatterjee et al. |
| 2002/0053006 A1* | 5/2002 | Kawamoto ............ G06F 12/121 711/128 |
| 2004/0186958 A1* | 9/2004 | Percival .............. G06F 12/0813 711/129 |
| 2007/0124560 A1 | 5/2007 | van Riel |
| 2007/0220201 A1* | 9/2007 | Gill ....................... G06F 12/123 711/113 |
| 2010/0106852 A1 | 4/2010 | Kindig et al. |
| 2011/0197046 A1 | 8/2011 | Chiu et al. |
| 2011/0295855 A1 | 12/2011 | Wang et al. |
| 2012/0221708 A1 | 8/2012 | Bhardwaj et al. |
| 2014/0115228 A1* | 4/2014 | Zhou ................... G06F 9/45533 711/102 |
| 2014/0279905 A1 | 9/2014 | Muniswamy-Reddy et al. |
| 2014/0310476 A1 | 10/2014 | Kruus et al. |
| 2014/0310499 A1* | 10/2014 | Sundararaman .... G06F 12/0269 711/203 |
| 2015/0067264 A1* | 3/2015 | Eckert ................... G06F 12/126 711/133 |
| 2015/0074350 A1* | 3/2015 | Chiang ............... G06F 12/0808 711/118 |
| 2016/0117323 A1 | 4/2016 | Sen et al. |

* cited by examiner

SYSTEMS AND METHODS TO MANAGE CACHE DATA STORAGE IN WORKING MEMORY OF COMPUTING SYSTEM

PRIORITY CLAIM

This U.S. non-provisional patent application is a continuation-in-part of U.S. non-provisional patent application Ser. No. 14/455,090, filed Aug. 8, 2014, which is hereby incorporated herein by reference in its entirety.

BACKGROUND

Field

This patent application relates generally to data caching and more specifically to managing cache data storage.

Description of Related Art

In computing systems, a cache is a memory system or subsystem which transparently stores data so that future requests for that data can be served faster. As an example, many modern microprocessors incorporate an instruction cache holding a number of instructions; when the microprocessor executes a program loop where the same set of instructions are executed repeatedly, these instructions are fetched from the instruction cache, rather than from an external memory device at a performance penalty of an order of magnitude or more.

In other environments, such as where a computing system hosts multiple virtual machines under the control of a hypervisor, with each virtual machine running one or more applications, caching of objects stored on a network attached storage system can provide significant performance improvements. In some instances, records are cached and then written to the network attached storage system according to a "write back" algorithm. In the "write back" algorithm, the received record is written to the cache before being written to the network attached storage system. The cache system can then direct the writing of the record to the network attached storage system.

When read commands are sent from the virtual machine to the network attached storage, it may be more efficient to read the records from the cache rather than from the network attached storage. While other write-through and write-back caching algorithms exist, caching and retrieving data quickly and accurately remains a challenge.

One common challenge in caching systems is that the read and write operations to the cache system are not optimized for the operational characteristics of the media used to store the contents of the cache system. Some examples of media used to store the contents of a cache system are random access memory (RAM), solid state disk (SSD), PCIe Flash, Non-volatile dual in-line memory module (NVDIMM), etc. Organizing data on a cache device for a plurality of cache media types remains a challenge.

Finally, storing data to, and removing data from, a cache system requires vigorous updates of metadata records of the cache system (e.g., index entries that reference the data stored in the cache system at any given point in time). These updates impose a significant performance overhead to storing, retrieving, and removing data from the cache system. As cache system media becomes faster, the overhead becomes a significant portion of the overall cache operation time and hampers efficient performance. More efficient metadata records for the cache system are required.

Another efficiency challenge in caching systems is ensuring adequate storage space for data to be cached without wastefully allocating too much memory for such use.

SUMMARY

According to some embodiments, a method comprises: receiving a first write command sent from a first virtual machine to a host operating system running on a computing system, the first write command instructing a storage system to store a first record at a first memory location; allocating a portion of working memory of the computing system; storing, at a first bucket address location of a working memory manager table, an address of the allocated portion of working memory; storing the first record in the allocated portion of working memory; storing, at a location in a cache index corresponding to the first memory location, the first bucket address and an indication that contents of the first memory location are stored in the allocated portion of working memory; receiving a first read command sent from the first virtual machine to the host operating system, the first read command instructing the storage system to read the first memory location; determining from the indication stored in the cache index that the contents of the first memory location are stored in the allocated portion of working memory; obtaining the first bucket address from the cache index using the first memory location; obtaining the address of the allocated portion of working memory from the working memory manager table using the obtained first bucket address; and reading the first record from the obtained address of the allocated portion of working memory.

According to other embodiments, a system comprises: a bucket manager configured to: receive a first write command sent from a first virtual machine to a host operating system running on a computing system, the first write command instructing a storage system to store a first record at a first memory location, store, at a first bucket address location of a working memory manger table, an address of the allocated portion of working memory, store the first record in the allocated portion of working memory, and a metadata manager configured to store at a location in a cache index corresponding to the first memory location, the first bucket address and an indication that contents of the first memory location are stored in the allocated portion of working memory; wherein the bucket manager is further configured to receive a first read command sent from the first virtual machine to the host operating system, the first read command instructing the storage system to read the first memory location; wherein the metadata manager is further configured to determine from the indication stored in the cache index that the contents of the first memory location are stored in the allocated portion of working memory; and wherein the bucket manager is further configured to: obtain the first bucket address from the cache index using the first memory location, obtain the address of the allocated portion of working memory from the working memory manager table using the obtained first bucket address, and read the first record from the obtained address of the allocated portion of working memory.

According to still other embodiments, a non-transitory computer readable medium having instructions embodied thereon, the instructions executable by one or more processors to perform operations comprising: receiving a first write command sent from a first virtual machine to a host operating system running on a computing system, the first write command instructing a storage system to store a first record at a first memory location; allocating a portion of working memory of the computing system; storing, at a first bucket address location of a working memory manager table, an address of the allocated portion of working memory; storing the first record in the allocated portion of working memory; storing, at a location in a cache index corresponding to the first memory location, the first bucket address and an indication that contents of the first memory location are stored in the allocated portion of working memory; receiving a first read command sent from the first virtual machine to the host operating system, the first read command instructing the storage system to read the first memory location; determining from the indication stored in the cache index that the contents of the first memory location are stored in the allocated portion of working memory; obtaining the first bucket address from the cache index using the first memory location; obtaining the address of the allocated portion of working memory from the working memory manager table using the obtained first bucket address; and reading the first record from the obtained address of the allocated portion of working memory.

DETAILED DESCRIPTION

Figure 1:
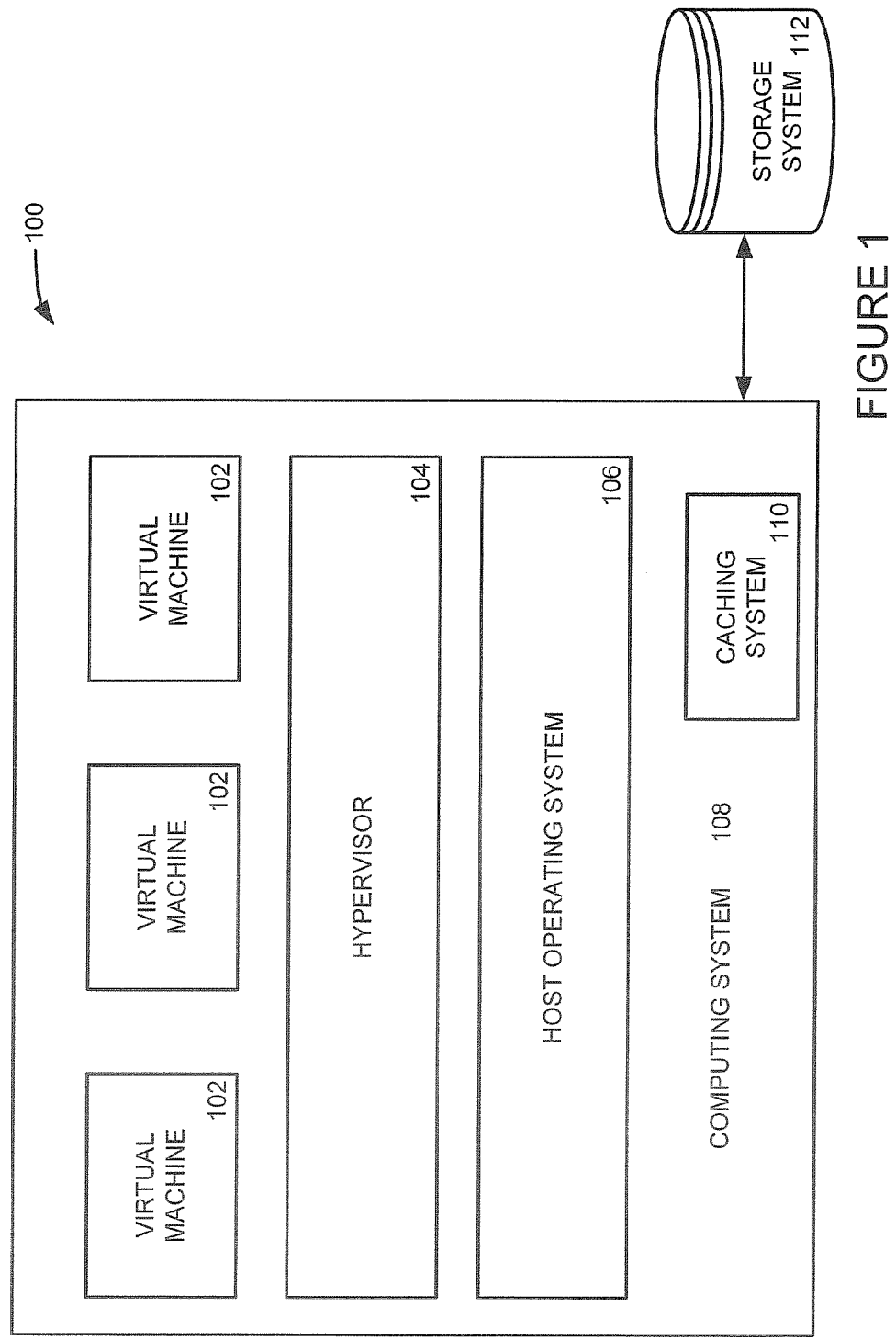
FIG. 1 is a block diagram of a portion of an environment in which various embodiments can be practiced.

Write-back and write-through caching techniques are used to reduce the amount of time required by a computing system to process read and write commands (also referred to as "IO" commands) by storing those commands in a faster, short-term memory, such as a storage cache, instead of relying solely on a slower, long-term memory, such as a storage system. Records can be written to or read from the storage cache during operation.

A typical IO command identifies a record using a memory location of the storage system. However, the caching system does not store the record at an address in the storage cache that is immediately recognizable from the memory location of the storage system. To read from the storage cache, it is necessary to have a way to determine where the record is stored in the storage cache from the memory location of the storage system. According to various embodiments described herein, a cache index is used to map a memory location of the storage system to a location in the storage cache when a record is written to the storage cache. The cache index may be extended to accommodate IO commands smaller than a predefined size. As described in the illustrative examples included herein, the cache index can be in the form of a BTree (also known as a Bayer Tree, Bushy Tree, or Boeing Tree).

The records are stored in buckets within the storage cache. In one embodiment, a bucket is a predefined contiguous set of locations in the storage cache. Each bucket is allocated to one virtual machine at a time. The bucket has a bucket address that includes a bucket identifier, a bucket index, and a generation number. From the bucket identifier and the bucket index, a location in the storage cache can be identified. From the generation number, a determination can be made as to whether the record stored in the bucket is stale.

In one embodiment, the storage cache comprises dedicated cache memory embodied in, for example, a flash-based memory device. In such an embodiment, the dedicated cache memory is a physically contiguous block of memory used exclusively to cache data. In an alternative embodiment, computing system working memory is instead used to cache data by the caching system due to its greater performance advantages. Unlike dedicated flash-based memory used to cache data, the computing system working memory is physically non-contiguous memory that is allocated, as needed, to cache data. Because the allocated working memory is non-contiguous, a working memory manager is used to translate storage cache addresses into non-contiguous working memory physical machine page addresses.

Further, unlike dedicated cache memory, the allocated working memory machine pages can be released by the caching system thereby freeing up working memory for other purposes or later reuse by the caching system. Releasing, or de-allocating, such working memory is accomplished by invalidating bucket-sized portions of the allocated working memory. To invalidate the bucket-sized portions, the bucket-sized portion having the highest bucket address is identified and, if the data in the corresponding working memory has been completely written to the storage system, marked as invalid. The bucket address and the generation number are stored so that, when and if the released working memory is again allocated, stale data is not read from the re-allocated working memory.

It is to be understood that, viewed at a high level and as made clear in the description herein, the system comprises a data layer used to store the cached data and an indexing layer used to access the cached data. These two layers operate independently to access and evict data stored in the cache. As discussed herein, a bucket manager is configured to execute the data layer and a metadata manager is configured to execute the indexing layer.

FIG. 1 is a block diagram of a portion of an environment 100 in which various embodiments can be practiced. The environment 100 comprises one or more virtual machines 102 executed by a hypervisor 104. The hypervisor 104 is executed by a host operating system 106 (which may itself include the hypervisor 104). The host operating system 106 resides on a physical computing system 108 having a caching system 110. The caching system 110 caches data within a local memory (e.g., a storage cache 208, discussed herein). The local memory is a faster, more expensive memory such as flash memory. The computing system 108 is configured to communicate with a storage system 112 to store data. The storage system 112 is a slower memory, such as a hard disk. The environment 100 can include multiple computing systems 108 and/or storage systems 112. Examples of storage system 112 include, but are not limited to, a storage area network (SAN), a local disk, a shared serial attached "small computer system interface (SCSI)" (SAS) box, a network file system (NFS), a network attached storage (NAS), and an object store.

When a virtual machine 102 generates a read command or a write command, the application sends the generated command to the host operating system 106. The virtual machine 102 includes, in the generated command, an instruction to read or write a record at a specified location in the storage system 112. The caching system 110 receives the sent command and caches the record and the specified storage system memory location. In a write-back system, the generated write commands are subsequently sent to the storage system 112.

In some embodiments of the present approach, and as is apparent to those skilled in the art in light of the teachings herein, the environment 100 of FIG. 1 can be further simplified to being a computing system running an operating system running one or more applications that communicate directly or indirectly with the storage system 212.

Figure 2:
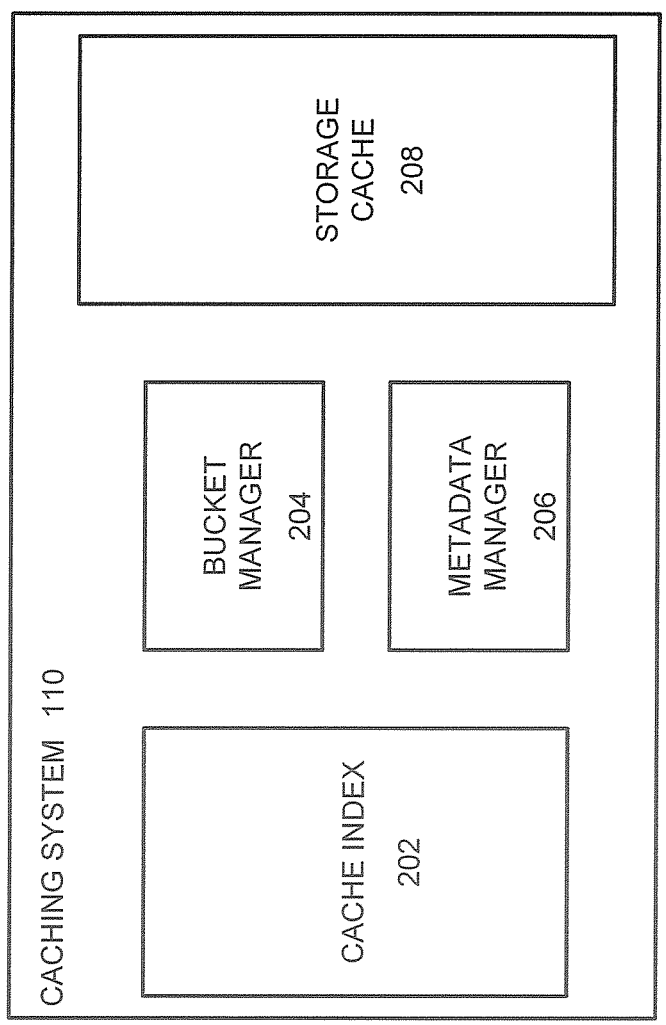
FIG. 2 is a block diagram of a caching system, according to various embodiments.

FIG. 2 is a block diagram of the caching system 110, according to various embodiments. The caching system 110 comprises a cache index 202, a bucket manager 204, a metadata manager 206, and a storage cache 208. The caching system 110 can be implemented in a variety of ways known to those skilled in the art including, but not limited to, as a computing device having a processor with access to a memory capable of storing executable instructions for performing the functions of the described modules. The computing device can include one or more input and output components, including components for communicating with other computing devices via a network (e.g., the Internet) or other form of communication. The caching system 110 comprises one or more modules embodied in computing logic or executable code such as software.

A cache index 202 is a logical data structure stored by the caching system 110. The cache index 202 is configured to store, for each memory location in the storage system 112 that has a record written thereto, a bucket address of a bucket in which a cached copy of the record is stored. In some embodiments, the cache index 202 is a BTree, as discussed in greater detail in connection with FIGS. 3-5.

When an IO command (e.g., a read command or a write command) is received, the bucket manager 204 is configured to determine the location in the storage cache 208 containing the desired record from the bucket address 404 in the cache index 202. The bucket manager 204 then executes the command or causes the command to be executed by another component of the caching system 110. The functionalities of the bucket manager 204 are explained in greater detail in connection with FIGS. 6-10.

The metadata manager 206 allocates those portions of the cache index 202 that correspond to memory locations in the storage system 112 (e.g., SAN memory locations) where records that have been cached in the cache storage 208 are stored or will be stored. The metadata manager 206 further traverses the cache index 202 to determine whether a record is stored in the storage cache 208. The metadata manager 206 can allocate or de-allocate levels, nodes, or entries in the cache index 202 depending on where records in the cache are stored in the storage system 112. As such, the size of the cache index 202 can be increased or decreased depending on the amount of records presently cached in the storage cache 208. The metadata manager 206 can expand the cache index 202 to include additional entries or levels. The functionalities of the metadata manager 206 are explained in greater detail in connection with FIGS. 6-10.

In an embodiment, the cache index 202 is organized into three levels and can be expanded to four levels, as discussed elsewhere herein. Each level of the cache index 202 contains one or more entries that are representative of a continuous range of memory locations in the storage system 112. For example, in embodiments where the storage system 112 is a SAN, SAN memory locations, expressed as SAN offset addresses, are divided within the cache index 202 so as to be contiguous with one another.

Figure 3:
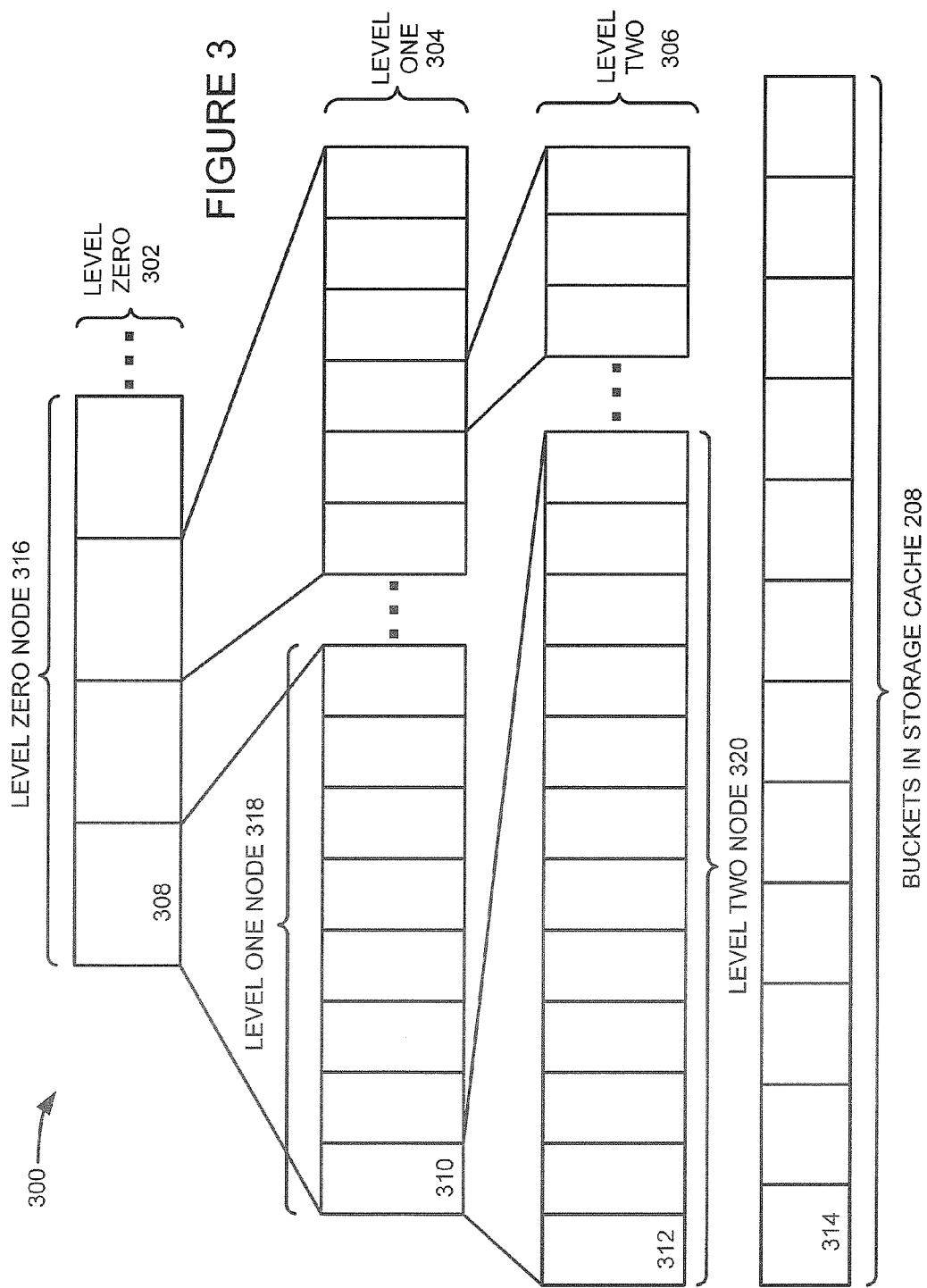
FIG. 3 is a diagram of a cache index in the form of a BTree, according to various embodiments.

To illustrate, FIG. 3 is a diagram of a cache index 202 in the form of a BTree 300, according to various embodiments. The BTree 300 has three levels, depicted as levels zero 302, one 304, and two 306. Due to space limitations of the figures, all of the entries and nodes in the BTree 300 are not depicted. As explained in greater detail elsewhere herein, level two 306 includes bucket addresses that specify cache locations organized in terms of buckets in the storage cache 208. In the example embodiment of FIG. 3, the storage system 112 is a SAN and memory locations in the storage system 112 are referred to as "SAN memory locations".

Level zero 302 comprises a single level zero node 316 having a series of entries that, in turn, correspond to a range of SAN memory locations of the SAN. The entries within the level zero node 316 at the level zero 302 collectively correspond to all of the SAN memory locations. To illustrate, level zero 302 can contain 16 entries each corresponding to one sixteenth of the available SAN memory locations. The level zero entry 308 can correspond to a first sixteenth of the SAN memory locations, the adjacent entry can correspond to a second sixteenth of the SAN memory locations, and so on for the third and fourth entries. In an embodiment, the individual entries within the level zero 302 comprise 16 bytes. The 16 bytes include a validity indicator and a pointer to a level one node 318 of a plurality of level one nodes in a level one 304.

As is known in the art, a SAN memory location can be expressed as an offset from SAN memory location zero (0). Using the BTree 300, and with the SAN having approximately 64 terabytes (TB) of storage, the level zero entry 308 corresponds to SAN memory locations at offsets of zero to four TB (one sixteenth of 64 TB). The next entry of the level zero 302 corresponds to SAN memory locations at offset of four TB to eight TB; the third entry of the level zero 302 corresponds to SAN memory locations at offset of eight TB to twelve TB; and the fourth entry of the level zero 302 corresponds to SAN memory locations at offset of twelve TB to sixteen TB, and so on (additional entries not depicted). Thus, the entirety of the memory locations in SAN (or other storage system 112) can be represented within the level zero 302.

Below the level zero 302 in the BTree 300, the level one 304 comprises a series of entries that each correspond to a narrower range of SAN memory locations than the entries at the level zero 302. Each entry within the level zero 302 has a corresponding node at the level one 304 (e.g., level zero entry 308 is the parent of level one node 318; not all nodes and entries are shown). The individual entries within the level one 304 include a validity indicator and a pointer to another entry in a level two 306. In some embodiments, each entry (e.g., level one entry 310) comprises sixteen bytes. The depicted node within the level one 304 comprises entries that collectively correspond to all of the SAN memory locations within level zero entry 308. Continuing the example above, the level zero entry 308 corresponds to SAN memory locations at offsets of zero to four TB. In one embodiment, to represent the entirety of this portion in the SAN (or other storage system 112), each entry in the nodes of level one 304 corresponds to 128 megabytes (MB) (one-thirty-two thousandth of 4 TB) and the level one 304 comprises four nodes, each potentially having 32,768 entries. Thus, the level one entry 310 corresponds to SAN offsets from zero to 128 MB, the next, offsets of 128 MB to 256 MB, the next, 256 MB to 384 MB, and so on until the entirety of the four TB is represented in a node within level one 304.

Below the level one 304 in the BTree 300, the level two 306 comprises a series of entries that each correspond to a narrower range of SAN memory locations than the entries at the level one 304. The entries within the shown level two node 320 collectively correspond to all of the SAN memory locations within level one entry 310. Each entry within level one 304 has a corresponding node at the level two 306 (not all nodes and entries are shown). Continuing the example above, the level one entry 310 can correspond to SAN memory locations at offsets of zero to 128 MB. In one embodiment, to represent the entirety of this portion in the SAN 112, each entry in the nodes of level two 306 corresponds to four kilobytes (kB) (one-thirty-two thousandth of 128 MB) of SAN memory. Thus the level two entry 312 corresponds to SAN offsets from zero to four kB, the next, offsets of 4 kB to 8 kB, the next, 8 kB to 12 kB, and so on until the entirety of the 128 MB is represented in a node within level two 306.

The storage cache 208 is organized in terms of buckets each representing, for example, 512 KB of cache memory. The exact size of the bucket can be chosen to be a value at which the underlying cache memory medium performs most efficiently. For example, an embodiment that operates on NAND flash devices as the cache memory medium uses the erase block size of the underlying flash device as the bucket size. Each entry in the level two 306 (e.g., level two entry 312) includes a bucket address that specifies a bucket 314 of the plurality of buckets in the storage cache 208 where the record stored at a SAN memory location is stored. Records stored at different SAN offsets can be stored in the same bucket 314. However, each entry in the level two 306 only includes one bucket address.

Figure 4:
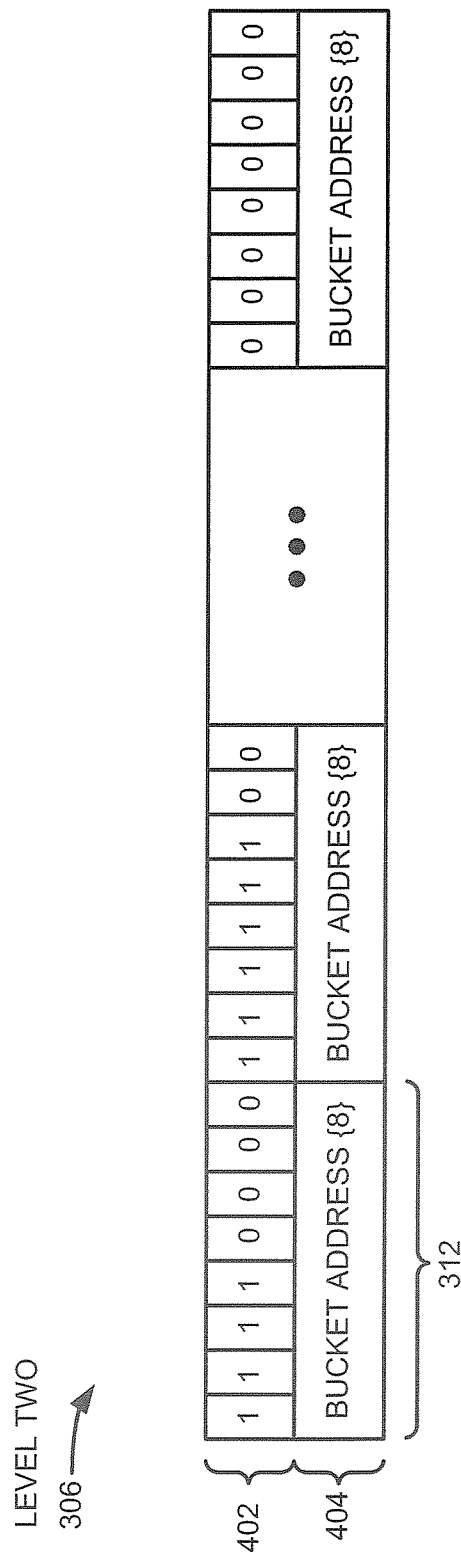
FIG. 4 is a diagram of a third level of the BTree, according to various embodiments.

FIG. 4 is a diagram of the level two 306 of the BTree 300, according to various embodiments. In some embodiments, each entry (e.g., level two entry 312) comprises sixteen bytes. A first portion of each level two entry 312 comprises a validity bitmap 402. The validity bitmap 402 indicates, for each further narrowed range of SAN memory locations of the level two entry 312, whether the whole record corresponding to that SAN memory location is stored in the cache memory 208 or only a part of the record is stored. Continuing the above example, where each level two entry corresponds to 4 kB of SAN address space, and where the validity bitmap 402 comprises 8 bits (as shown in FIG. 4), the further narrowed range comprises 512 bytes (i.e., 0.5 kB). Thus, in the entry 312 as shown in the figure, the storage cache 208 presently stores records corresponding to SAN offset addresses zero to two kB (the first four bits times 512 B per bit) and does not store records corresponding to SAN offset addresses from 2 kB up to 4 kB.

The second portion of the level two entry 312 of the BTree 300 comprises a bucket address 404. In the depicted embodiment, the level two entry 312 comprises only one bucket address. The bucket address is eight bytes and contains a bucket number, a bucket index, and a bucket generation number. The bucket number identifies a bucket 314 of the buckets 314 constructed within the storage cache 208 where the record having that SAN memory address is stored. The bucket index identifies a location within the bucket 314 where the record is stored. Because the buckets 314 can be significantly larger than individual records, multiple records at separate SAN offsets can be stored in the same bucket 314. In some instances, a bucket is 512 KB of cache memory. A generation number included in the bucket address indicates the generation number of the bucket 314 at the time the record was stored in the bucket 314. As will be discussed in connection with the bucket manager 204, the bucket generation number is used when determining if the contents of bucket 314 have been invalidated since the record was stored in the bucket 314.

Figure 5:
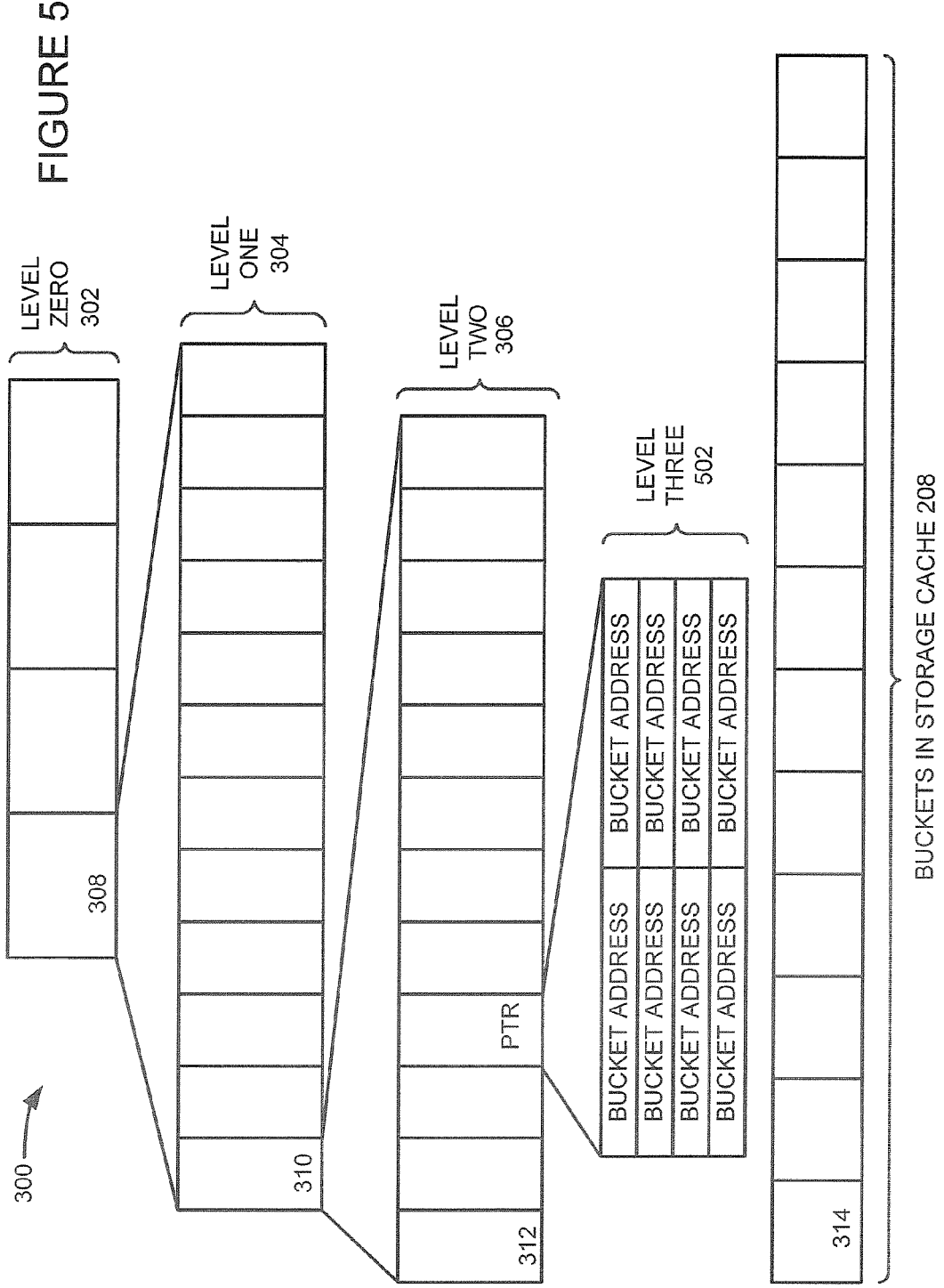
FIG. 5 is a diagram of the BTree having a further level, according to various embodiments.

FIG. 5 is a diagram of a BTree 300 having a further level, according to various embodiments. In some instances, IO commands can include records that are smaller than a level two entry 312 can address (in our example above, 4 kB). As would be understood by one of skill in the art, these records are referred to as unaligned IO commands because they may not align with 4 kB address boundaries. When two records are within the offsets specified by the same four kB level two entry 312, and are stored in separate buckets 314, the level two entry 312 cannot accommodate both bucket addresses 404. As such, a further level three entry 502 is added to the BTree 300. The level three entry 502 corresponds to four kB of space in the storage system 112 (e.g., a SAN) like the level two entry 312. However, a level three entry 502 is much larger than a level two entry 312 because it can address parts of the four kB address space as independent segments, as described below. In one embodiment, the level three entry 502 can contain up to eight bucket addresses 404. The level three entry 502 further comprises a level three entry generation number that is used when determining if the bucket 314 has been evicted since the record included in the unaligned IO command was stored in the bucket 314 and a pin count, which is described elsewhere herein.

Figure 6:
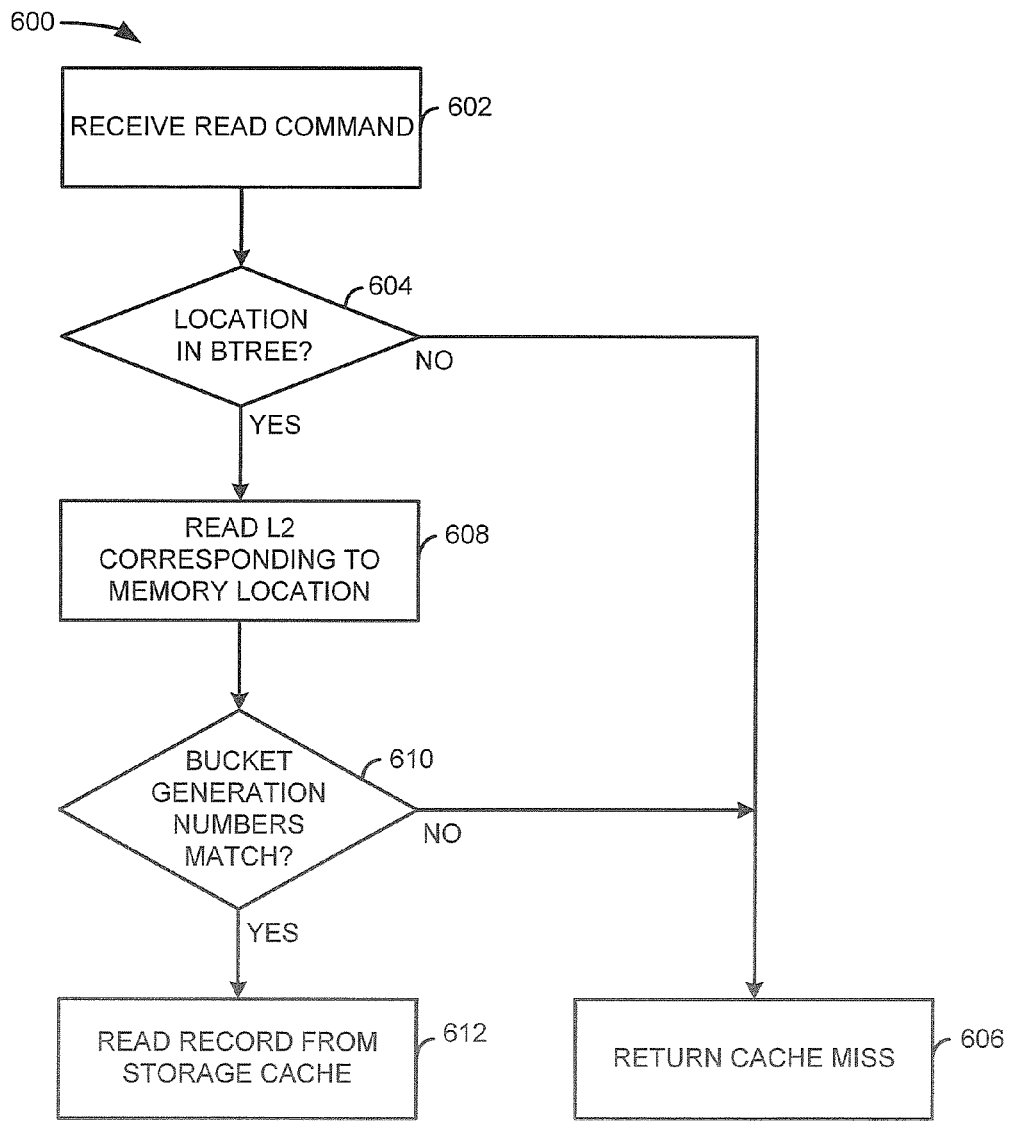
FIG. 6 is a flowchart of a method of executing a read command, according to various embodiments.

When a read command is received, the BTree 300 is used to determine if the record of the read command specified by a SAN memory location is stored in the storage cache 208. If the record is stored in the storage cache 208, the BTree 300 identifies a bucket 314 in the cache storage 208 where the record is stored. FIG. 6 is a flowchart of a method 600 of executing a read command, according to various embodiments. The method 600 can be performed by the bucket manager 204 in connection with the BTree 300 and the storage cache 208. As will be explained, the metadata manager 206 is configured to traverse the BTree 300.

In an operation 602, a read command sent from the virtual machine 102 to the host operating system 106 is received by the caching system 110. In embodiments where the storage system 112 comprises a SAN, the read command specifies the record to be read by a SAN memory location (e.g., a SAN offset address), and a length of data to be read. The read command also indicates a buffer where the record is to be written to.

Figure 7:
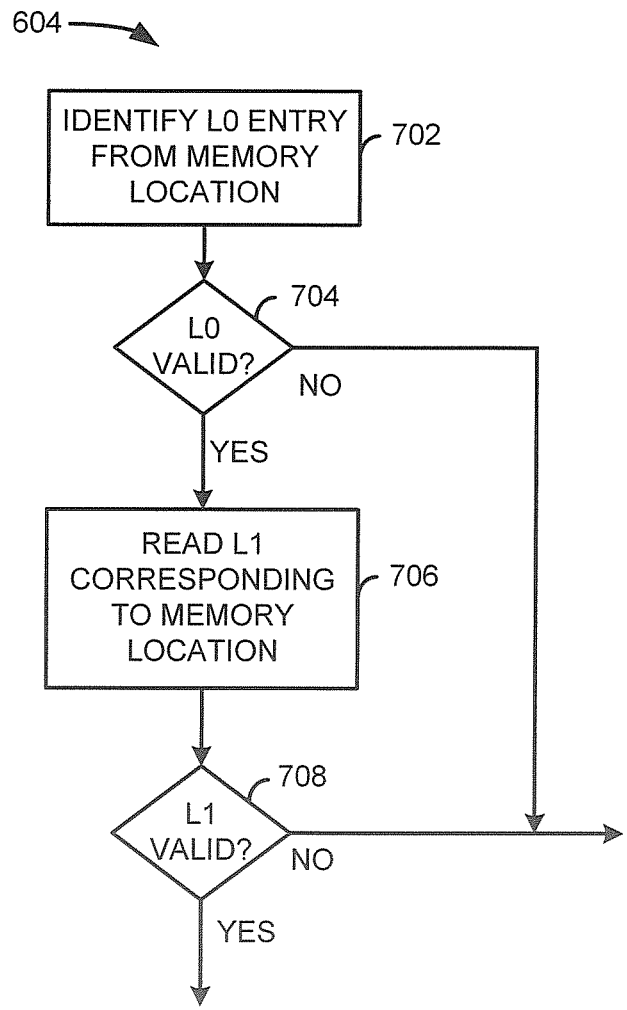
FIG. 7 is a flowchart of a method of traversing the BTree, according to various embodiments.

In an operation 604, a determination is made by, for example, the metadata manager 206, whether the record has been cached for the SAN memory location. To determine whether the record stored at the SAN memory location is cached, the cache index 202 (e.g., BTree 300) is traversed by the metadata manager 206. The traversal of the cache index 202 returns a cache miss or a bucket address of the cached record. FIG. 7 is a flowchart of a method 604 of traversing a BTree 300, according to various embodiments.

In an operation 702, the SAN offset address (or memory address of the storage system 112) included in the read command is used to identify a corresponding entry (e.g., level zero entry 308) in the level zero (L0) 302 of the BTree 300. The metadata manager 206, in an operation 704, determines whether the level zero entry 308 is valid. The level zero entry 308 is valid if at least one record has been stored in the range of SAN memory locations covered by the level zero entry 308. If no records have been stored in that range of SAN memory locations, the offset is not cached in the BTree 300 and the level zero entry is not valid.

If the level zero entry 308 is valid, the method 604 continues to operation 706. In the operation 706, the metadata manager reads the level one (L1) entry (e.g., the level one entry 310) corresponding to the received SAN offset address. The metadata manager 206 then determines, in an operation 708, whether the level one entry 310 is valid. Like the determination in the operation 704, the level one entry is valid if records have been stored in the corresponding portion of the SAN. If no records have been stored in that portion of the SAN, the offset is not cached in the BTree 300 and the level one entry 310 is not valid. If the level one entry 310 is valid, the method 604 returns a "yes", indicating that the SAN offset is cached in the BTree 300.

Returning to FIG. 6, if the outcome of the determination in operation 604 is that the SAN offset is not cached in the cache index 202, a cache miss is returned in an operation 606. If, however, the outcome of the determination in the operation 604 is that the offset is cached in the cache index 202, the bucket manager 204 reads the level two entry 312 of the cache index 202 corresponding to the SAN memory address, in the operation 608. As part of the operation 608, the bucket manager 204 further determines the location in the storage cache 208 where the record is stored from the bucket address 404. While not shown, at the operation 608, the method 600 can return a cache miss (operation 606) if, for example, the validity bitmap 402 indicates that the contents at the SAN memory location are not stored in the storage cache 208 or if the level two entry 312 does not contain a bucket address 404.

In an operation 610, bucket generation numbers are compared to determine if there is a match. As explained with respect to FIG. 4, the bucket address 404 included in the cache index 202 includes a bucket generation number indicating the generation of the bucket 314 at the time the record was stored in the bucket 314. The bucket manager 204 stores a current bucket generation number as part of the eviction process described elsewhere herein. If the bucket generation number stored in the cache index 202 does not match the current bucket generation number stored by the bucket manager 204, a cache miss is returned in operation 606. If the generation numbers do match, in an operation 612, the bucket manager 204 reads the record identified in the read command from the storage cache 208.

Figure 8:
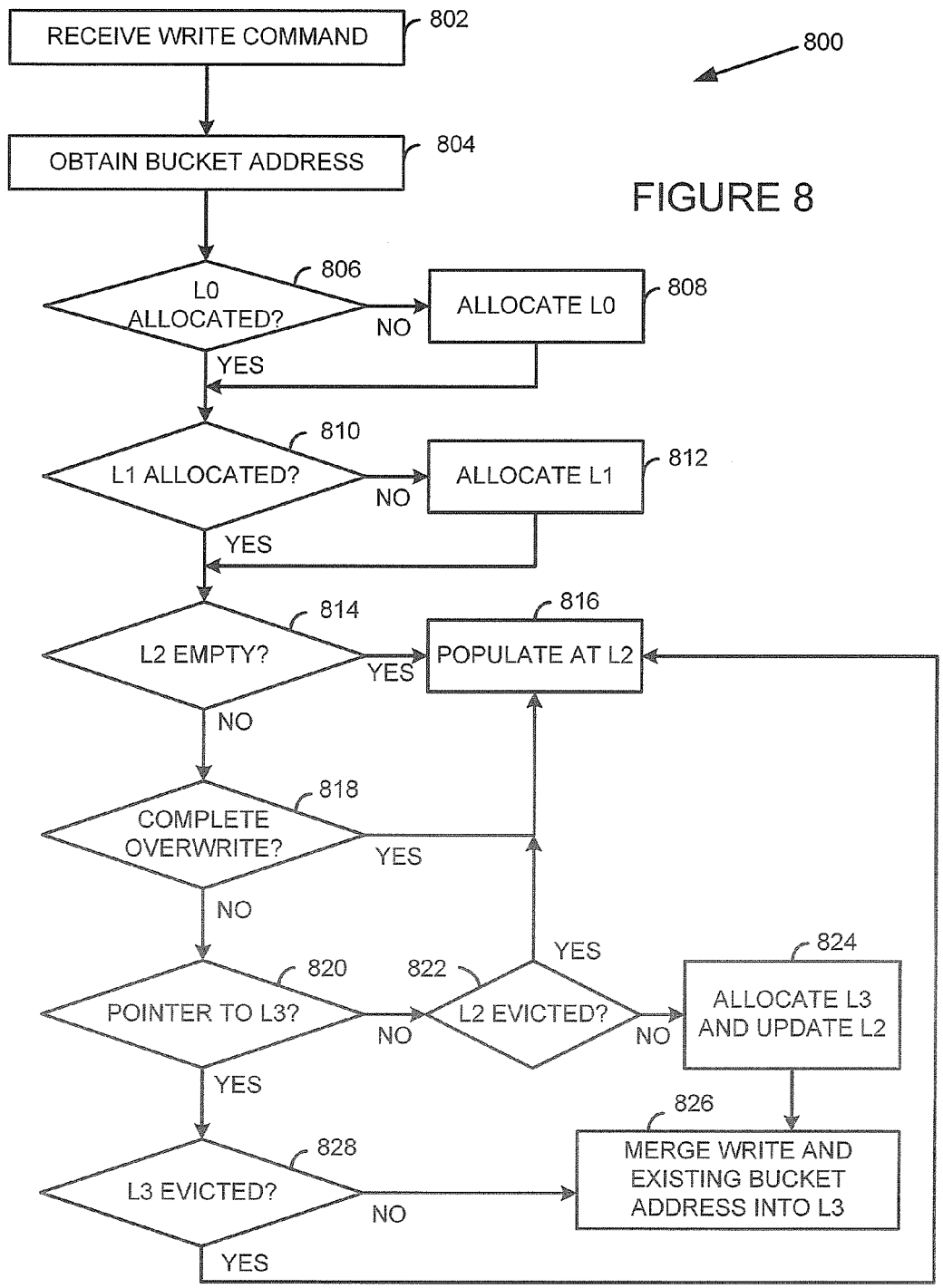
FIG. 8 is a flowchart of a method of executing a write command, according to various embodiments.

FIG. 8 is a flowchart of a method 800 of executing a write command, according to various embodiments. The method 800 is performed by the caching system 110, and, more specifically by the bucket manager 204 and the metadata manager 206.

In an operation 802, a write command is received from the virtual machine 102 by the caching system 110. In embodiments where the storage system 112 comprises a SAN, the write command comprises a SAN memory location where a record is to be stored, a length of the record, and the record to be stored.

In an operation 804, a bucket address 404 where the record is stored in the storage cache 208 is obtained from the bucket manager 204. The operation 804 is described in greater detail in connection with FIG. 10.

In an operation 806, the metadata manager 206 determines whether the level zero entry (e.g., level zero entry 308) corresponding to the SAN memory location is allocated (i.e., valid) in the cache index 202. If the L0 entry 308 is not allocated, the metadata manager 208 allocates the L0 entry 308 in an operation 808.

Once the L0 entry 308 is allocated or validated, the metadata manager 206 determines whether the level one entry (e.g., level one entry 310) corresponding to the SAN memory location is allocated in the cache index 202, in an operation 810. If the level one entry 310 is not allocated, the metadata manager 206 allocates the level one entry 310 in an operation 812.

In an operation 814, the metadata manager 206 determines whether the level two entry (e.g., level two entry 312) corresponding to the SAN memory location included in the write command is empty, and thus available. If the level two entry 312 is empty, the metadata manager 206, in an operation 816, populates the obtained bucket address 404 of the operation 804 at the level two entry 312. In this operation 816, the metadata manager 206 further updates the validity bitmap 402 of the level two entry 312 to indicate the SAN memory location of the record.

If the outcome of the determination operation 814 is that the level two entry 312 is not empty, in an operation 818, the metadata manager 206 determines whether the record included in the write command of the operation 802 has completely overwritten the existing level two entry 312. If so, the obtained bucket address 404 is populated at the level two entry 312 and the validity bitmap 402 is updated in the operation 816.

If the outcome of the determination operation 818 is that the record included in the write command of the operation 802 did not completely overwrite the existing level two entry 312, the received record can be an unaligned IO command having a size of less than four kB. In this case, the metadata manager 206 determines whether the level two entry 312 contains a pointer to a level three entry 502 in an operation 820.

If the outcome of the determination operation 820 is that there is no pointer to a level three entry 502, the metadata manager 206 determines whether the level two entry 312 is evicted in an operation 822. Eviction is discussed below, at least in connection with FIG. 10. Similar to the operation 610, the metadata manager 206 determines whether the generation number in the bucket address 404 obtained in the operation 804 from the bucket manager 204 matches a generation number in the bucket address 404 stored in the cache index 202. If the generation numbers do not match, the level two entry 312 is evicted. The metadata manager 206 populates the obtained bucket address 404 of the operation

804 at the level two entry 312 and updates the validity bitmap 402 in the operation 816.

In an operation 824, if the outcome of the determination operation 822 is that the level two entry 312 is not evicted, the metadata manager 206 allocates a level three entry 502 to accommodate the unaligned IO command in an operation 824. In this operation 824, the metadata manager 206 updates the level two entry 312 to include a pointer to the level three entry 502.

In an operation 826, the metadata manager 206 merges the bucket address obtained in the operation 804 and the existing bucket address in the level two entry 312 to the allocated level three entry 502. Thus, the level three entry 502 can store two or more bucket addresses 404 indicating where each unaligned IO command is stored.

Returning to the operation 820, if the determination made is that there is an existing pointer to the level three entry 502 in the level two entry 312, in an operation 828, the metadata manager 206 determines if the level three entry 502 has been evicted by comparing the generation numbers in the bucket addresses 404 stored in the level three entry 502 to the generation numbers in the bucket addresses 404 maintained by the bucket manager 204. If the generation numbers do not match, the buckets in the level three entry 502 have been evicted and the operation 816 is performed.

If, however, the determination made in the operation 828 is that the level three entry 312 has not been evicted, the metadata manager 206 performs operation 826 where the bucket address 404 obtained in the operation 804 is merged with the existing bucket address 404 into the level three entry 502.

Figure 9:
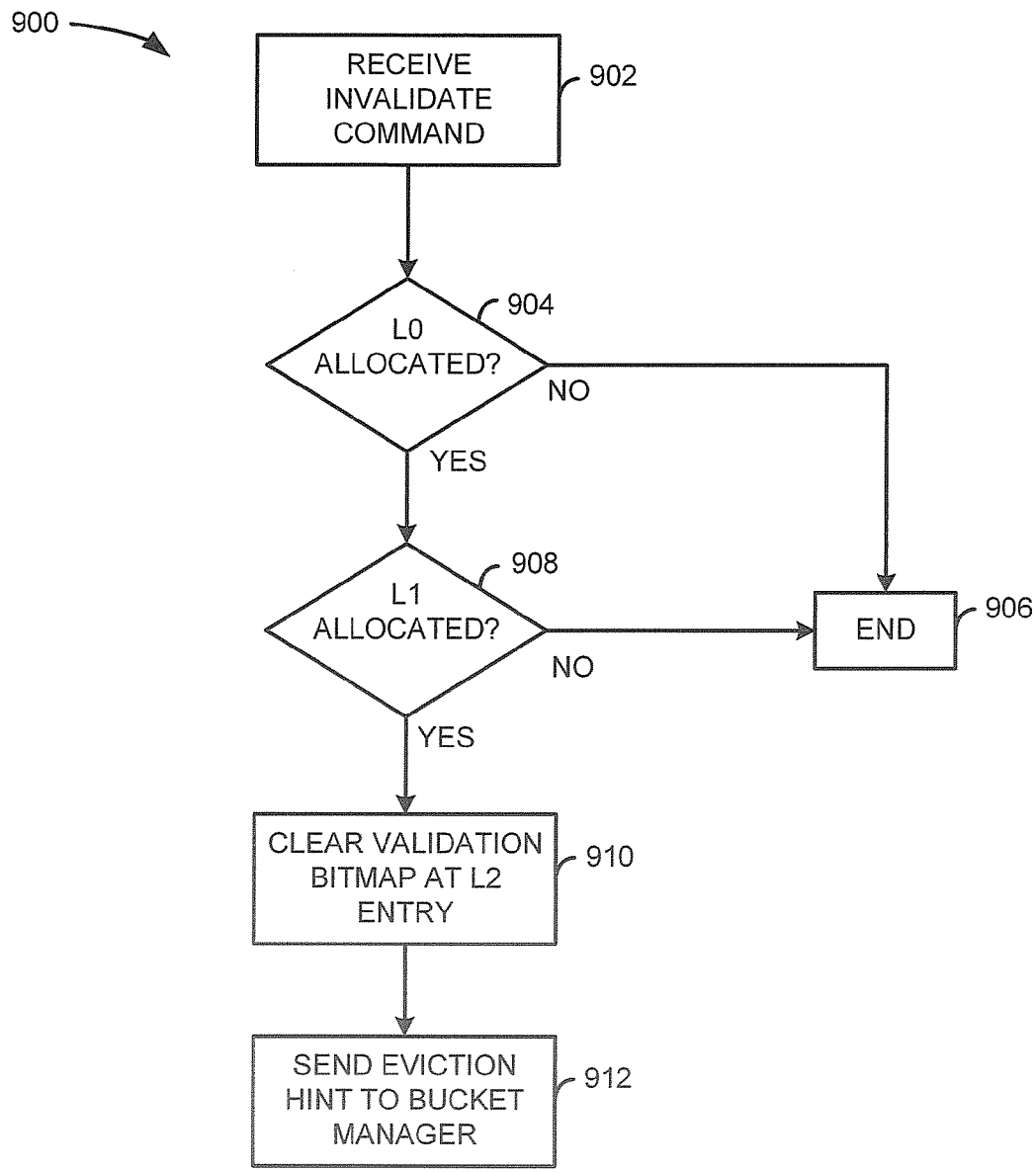
FIG. 9 is a flowchart of a method of executing an invalidate command, according to various embodiments.

FIG. 9 is a flowchart of a method 900 of executing an invalidate command, according to various embodiments. An invalidate command is a command like the read command and the write command. The invalidate command tells the caching system 110 to no longer read a record stored in the storage cache and includes a memory address of the storage system 112 (e.g., a SAN memory location) and length of the record to be invalidated. The discussion of FIG. 9 describes an embodiment where the storage system 112 comprises a SAN.

In an operation 902, the metadata manager 206 receives an invalidate command from the virtual machine 102 identifying a SAN memory location (e.g., SAN offset address) to be invalidated.

If the higher level entries are not allocated in the BTree 300 for the SAN memory address included in the invalidate command, the BTree 300 does not store a bucket address for the SAN memory location. In an operation 904, the metadata manager 206 determines whether the level zero entry 308 corresponding to the SAN memory address included in the invalidate command is allocated. If not, the process 900 ends in an operation 906. Otherwise, in an operation 908, the metadata manager 206 determines whether the level one entry 310 corresponding to the SAN memory address included in the invalidate command is allocated. If not, the process 900 ends in an operation 906.

Otherwise, in an operation 910, the metadata manager 206 identifies the level two entry 312 corresponding to the SAN memory location included in the invalidate command of the operation 902 and clears the validation bitmap 402 of the level two entry 312 by setting all of the values to zero.

In an operation 912, the metadata manager 906 sends an eviction hint to the bucket manager 204. The eviction hint identifies the bucket address 404 included in the level two entry 312 and indicates to the bucket manager 204 that the bucket manager 204 can evict the bucket 314.

Figure 10:
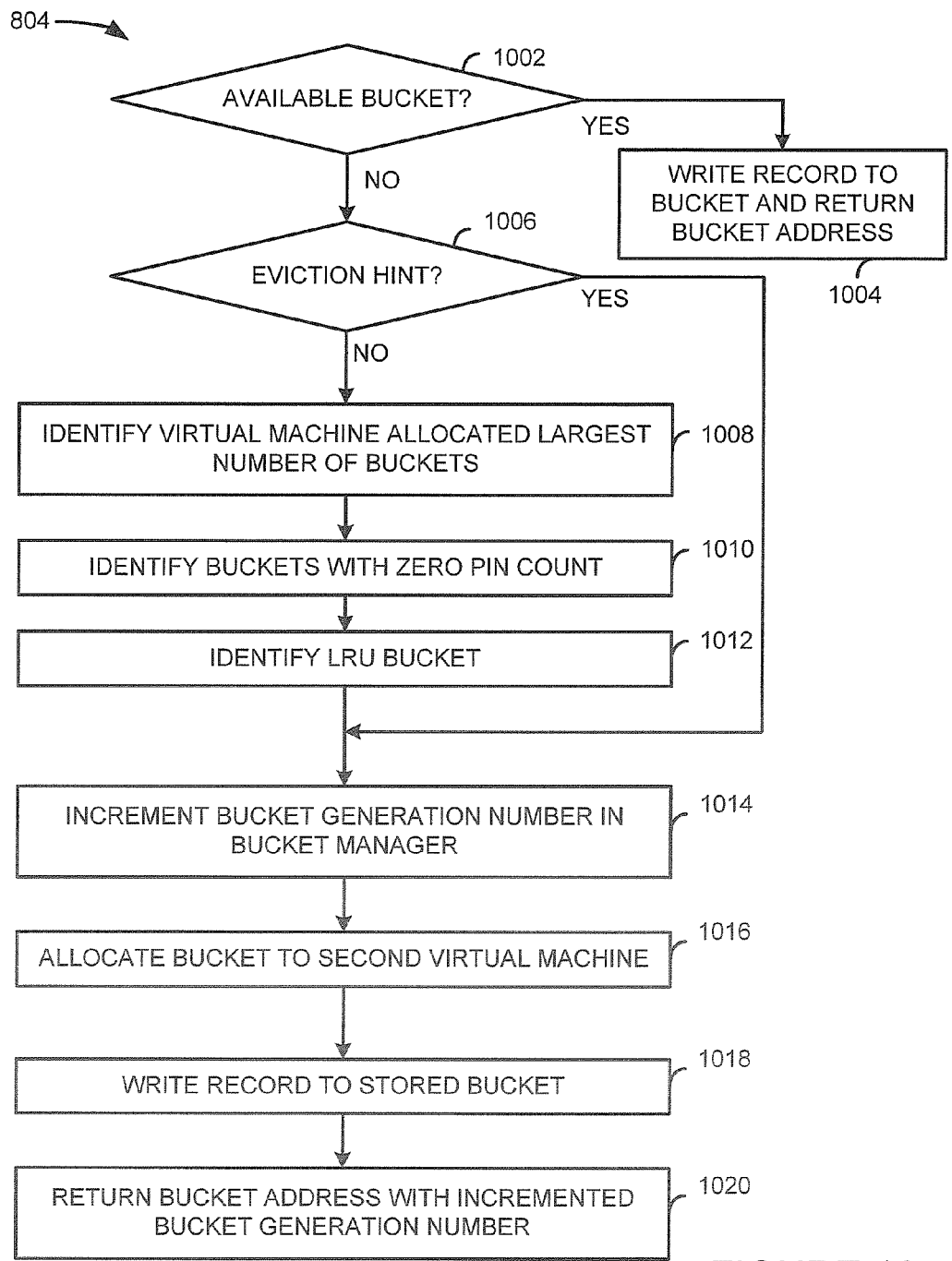
FIG. 10 is a flowchart of a method of evicting a bucket and returning a bucket address according to various embodiments.

Eviction is the process by which buckets in the storage cache 208 can be marked as free for subsequent reuse. FIG. 10 is a flowchart of a method 804 of evicting a bucket 314 and returning a bucket address 404 according to various embodiments. The method 804 can be performed by the bucket manager 204 and, in an embodiment, is initiated when a write command is received from the virtual machine 102.

In an operation 1002, the bucket manager 204 determines whether there is a bucket 314 allocated to the virtual machine 102 from which the write command was received and having available space to store the record included in the received write command. If there is a bucket 314 available, in an operation 1004, the bucket manager 204 writes the record included in the write command to the available bucket 314 and returns the bucket address 404 where the record was written to the metadata manager 206.

In an operation 1006, if there is no available bucket 314, the bucket manager 204 determines if an eviction hint has been received from the metadata manager 206 as described in connection with FIG. 9. If an eviction hint has been received, the method 804 skips ahead to the operation 1014, discussed below.

In an operation 1008, if no eviction hint has been received, the bucket manager 204 identifies which virtual machine has the largest number of buckets 314 allocated to it. The bucket manager 204 determines a number of buckets 314 allocated to each virtual machine 102 in the environment 100. As discussed above, by being allocated to a virtual machine 102, the individual buckets 314 contain records sent by only one virtual machine 102. A bucket descriptor array of the bucket identifies the virtual machine to which the bucket is allocated.

In an operation 1010, the buckets 314 allocated to the identified virtual machine 102 are evaluated so as to identify buckets 314 having all of their stored records sent to the storage system 112. This is accomplished by the bucket manager 204 checking a pin count of the bucket 314. The pin count is a value stored in a bucket descriptor array that indicates how many records stored in the bucket 314 have not yet been written to the storage system 112. When a record is written to the bucket 314, and before it is included in a write command sent to the storage system 112, the pin count is incremented by the bucket manager 204. After the record in the bucket 314 is retrieved and included in a write command sent to the storage system 112, thus writing back the record, the pin count is decremented by the bucket manager 204. When a bucket 314 includes multiple records (which can be at distinct memory locations in the storage system 112), the pin count can be of a value up to the number of records in the bucket 314. As the records in the bucket 314 are written back to the storage system 112, the pin count is decremented by the bucket manager 204. A zero pin count indicates that the records stored in the bucket 314 are stored in the storage system 112.

In an operation 1012, if more than one bucket 314 allocated to the identified virtual machine 102 has a zero pin count, a least recently used (LRU) bucket is identified. An LRU bucket is a bucket 314 that has been not been written to or read from more recently than other buckets 314 allocated to the virtual machine 102. In an embodiment, the LRU bucket is selected for eviction.

It is to be understood that, by identifying a bucket to be evicted based on the determinations 1008 and 1012, buckets 314 can be more evenly balanced among the virtual machines 102.

In an operation 1014, based on the eviction hint of the operation 1006 or the LRU bucket identified in the operation 1012, the bucket manager 204 evicts the bucket 314. To evict the bucket 314, the bucket manager 204 increments a bucket generation number included in the bucket address 404 maintained by the bucket manager 204. The bucket manager 204 does not update or increment any bucket generation numbers in the bucket addresses 404 stored in the cache index 202. In this way, eviction is handled independently of the cache index 202. Thus, when reading from, or writing to, the storage cache 208, the bucket generation number in the bucket address 404 stored in the cache index 202 is compared to the bucket generation number stored by the bucket manager 204 (see, e.g., operation 610, operation 822, and operation 828) to ensure that the record is not stale and can be retrieved from the cache storage 208 rather than the storage system 112.

In an operation 1016, the evicted bucket 314 is allocated to the virtual machine 102 that sent the write command by the bucket manager 204 by writing a virtual machine identifier to the bucket descriptor array. In an operation 1018, the record is stored in the evicted bucket 314 by the bucket manager 204. In an operation 1020, the bucket address 404, with the incremented bucket generation number, is returned by the bucket manager 204 to the metadata manager 206.

Using the described systems and methods, records sent from a virtual machine 102 to a host operating system 106 are cached. A cache index 202 is used to determine a bucket 314 in the storage cache 208 where the record is cached based on a memory location of the storage system included in a read command. To write records to the storage cache 208, the record is stored in a bucket 314 and the cache index 202 is updated to include the bucket address 404. Unaligned IO commands can be accommodated in the cache index 202 by expanding the cache index to include a further level. Buckets 314 can be evicted by the bucket manager 204 independently of the cache index 202 or the metadata manager 206, resulting in more efficient eviction.

Figure 11:
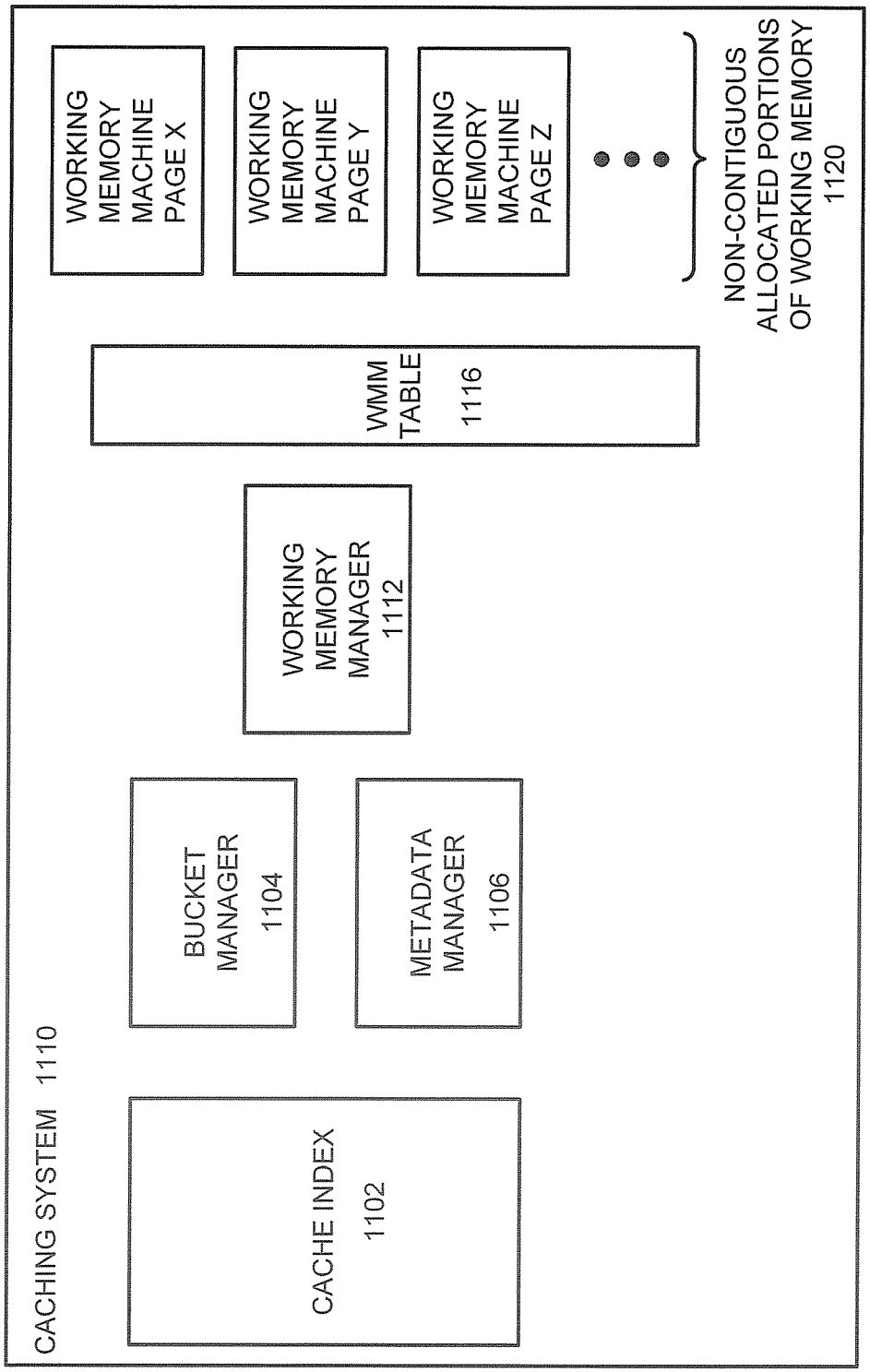
FIG. 11 is a block diagram of an alternative embodiment caching system to cache data in working memory of a computing system, according to various embodiments.

As stated above, in an alternative embodiment and to provide further performance advantages, portions of working memory of computing system 108 are allocated for use by the caching system to cache data instead of using a dedicated contiguous memory such as a flash-based device as has been described. Referring now to FIG. 11 is a block diagram of such a caching system 1110 to cache data in computing system working memory, according to various embodiments. In caching system 1110, a cache index 1102 is the same as and performs the same function as the cache index 202 of FIG. 2 and forms the indexing layer. A bucket manager 1104 is the same as and performs the same function as the bucket manager 204 of FIG. 2. A metadata manager 1106 is similar to and performs the same function as the metadata manager 206 of FIG. 2 and is configured to generate and update the cache index 1102.

The caching system 1110 further includes allocated portions of working memory 1120 of computing system 108 by virtue of dynamic cache re-sizing. The allocated portions of the working memory 1120 are physically non-contiguous machine pages of computing system 108 which are typically comprised of a faster, volatile, more expensive memory such as Random Access Memory (RAM). The allocated portions of working memory 1120 can be allocated to, and released from, the cache system 1110 by the caching system 1110 as needed and as described herein.

Because the allocated portions of working memory 1120 are non-contiguous, and because the bucket manager 1104 (as was described above with reference to bucket manager 204) is configured to cache data at contiguous memory locations in a dedicated cache memory such as storage cache 208, caching system 1110 includes a working memory manager 1112 and a working memory manager (WMM) table 1116. As will be explained, the working memory manager 1112 performs the function of translating contiguous cache memory addresses, such as those intended for storage cache 208 of FIG. 2, into non-contiguous working memory machine page addresses, using the working memory manager table 1116, in order to write data to or read data from the working memory machine page addresses. The working memory manager 1112 can additionally perform the functions of allocating and releasing working memory machine pages from the caching system 1110, as needed.

Figure 12:
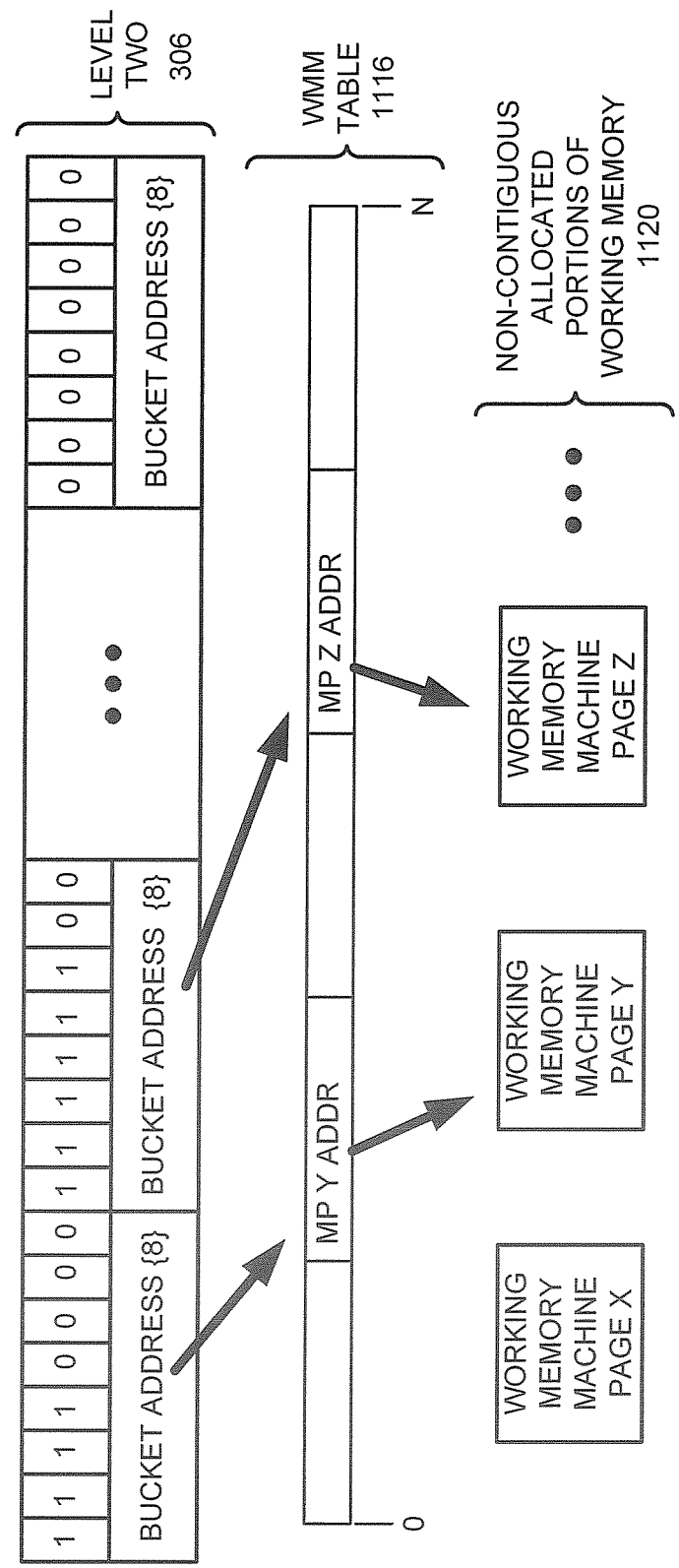
FIG. 12 is a diagram of level two of the BTree, a working manager memory table and non-contiguous allocated portions of working memory, according to various embodiments.

Referring now to FIG. 12 is a diagram of level two 306 of the BTree 300 (as was described with reference to FIG. 3, et seq.), working memory manager table 1116, and non-contiguous allocated portions of working memory 1120 including working memory machine pages X, Y, and Z, according to various embodiments of cache data storage system 1110 using working memory to cache data.

As has been described, the second portion of a level two entry (e.g., 404 in FIG. 4) comprises a bucket address which, again, comprises a bucket number, an index, and a generation number. As has also been described, in the case of a bucket address directed to a bucket in the contiguous memory of storage cache 208 (of FIG. 4), the bucket number is used to directly determine a physical memory address in storage cache 208. For example, with a bucket address having a bucket number of 1 and an index of 0, the caching system knows to read the first (=index 0) stored record in the second (1 times the bucket size) bucket size area of the storage cache 208. Again, this is possible because of the contiguous nature of memory in storage cache 208. However, such memory contiguousness cannot be presumed when using allocated portions of working memory 1120. Instead, referring still to FIG. 12, the bucket address is used by the working memory manager 1112 to locate a virtual bucket of working memory manager table 1116 in which is stored an address of a working memory machine page. This is indicated in the figure by an arrow from a bucket address of level two 306 pointing to a location in working manager memory table 1116. The working memory machine page address is then used to write data to or read data from the working memory machine page. This is indicated in the figure by an arrow from a location in working memory manager table 1116 to a working memory machine page. As would be understood by one of skill in the art in light of the teachings herein, this address translation function is facilitated, in one embodiment, by the sequential addressing range, shown as "O" through "N" in the figure, to locations within the working memory manager table 1116 which therefore operate as virtual buckets.

As was described above with reference to using storage cache 208 to cache data records, in some embodiments of working memory based caching system 1110, a generation number included in the bucket address of the level two 306 indicates the generation number of the machine page at the time a data record was stored in the machine page of the working memory. As was discussed in connection with the bucket 314 and as will be discussed below in connection with the bucket manager 1114, the generation number is used when determining if the stored contents in the machine page of the working memory 1120 have been invalidated since the data record was cached. The machine page can be invalidated in anticipation of, for example, releasing the allocated portion of the working memory.

Figure 13:
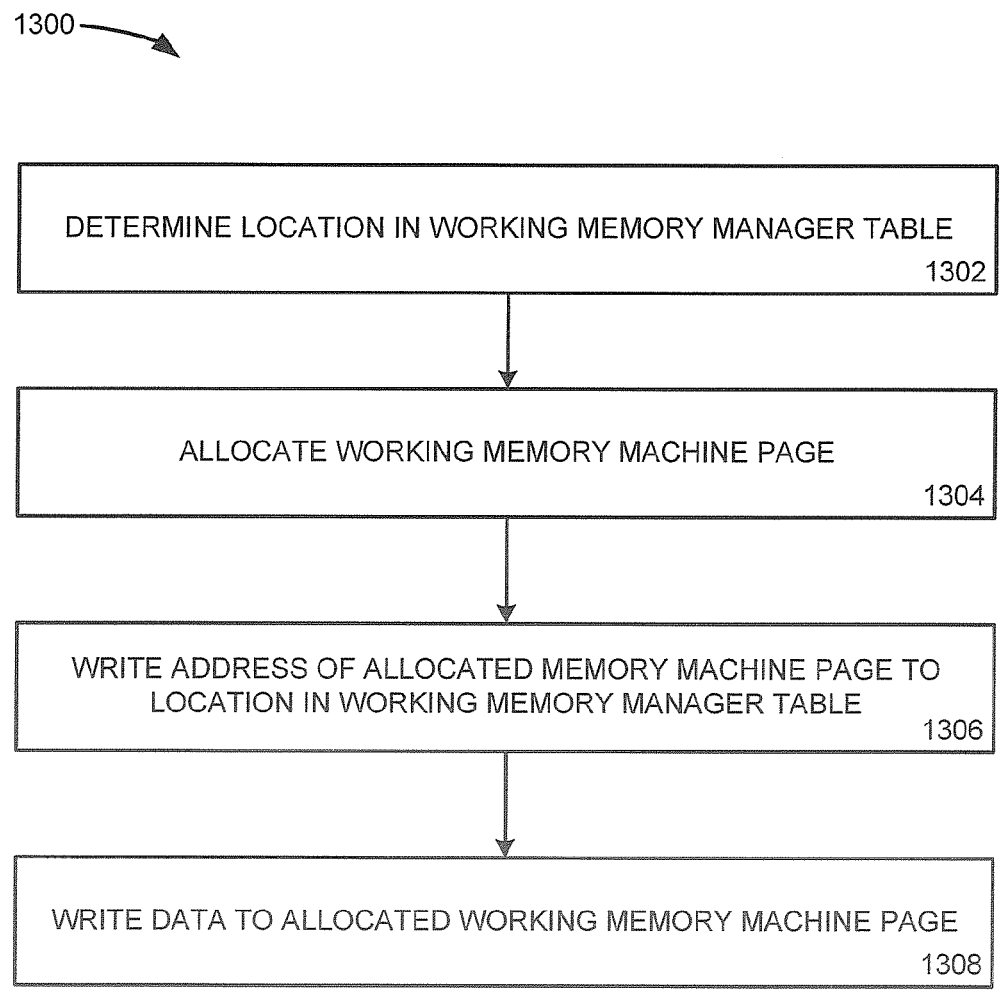
FIG. 13 is a flowchart of a method of writing data to working memory cache including allocating portions of working memory, according to various embodiments.

FIG. 13 is a flowchart of a method 1300 of writing data to working memory cache including allocating portions of working memory, according to various embodiments. The method 1300 can be performed by caching system 1110 and, more particularly, by metadata manager 1104, bucket manager 1106, and working memory manager 1112, as an expansion to the processes described with reference to FIGS. 8 and 10. In particular and as described above, operation 804 of FIG. 8, expanded as shown and described with reference to FIG. 10, includes operations 1004 and 1018 each of which included writing a data record to a bucket in storage cache 208 of FIG. 2. By contrast, as stated above, caching system 1110 writes data to allocated portions of working memory 1120 as will now be described.

It is to be understood that the method 1300 is ultimately initiated by, for example and as has been described elsewhere herein, receipt of a write command that causes caching system 1110 to cache a data record and the bucket manager 1104 has obtained a bucket address from BTree 300 using a SAN offset address from the write command. However, rather than bucket manager 1104 using that bucket address to locate and access a physical memory address in contiguous memory of storage cache 208, instead, in an operation 1302, working memory manager 1112 uses the bucket address (again, comprising a bucket number and bucket index) to determine a location in working memory manager table 1115. Working memory manager 1112 performs this location determination operation in basically the same way that bucket manager 1104 addressed cached data in storage cache 208, that is, by multiplying the bucket number times the bucket size and adding the bucket index to yield an offset from a beginning address of the working memory manager table 1116.

In an operation 1304, a portion of working memory 1120 (e.g., a working memory machine page) within the computing system 108 is allocated for use by caching system 1110 as cache memory.

In an operation 1306, an address of the newly-allocated portion of working memory 1120 (e.g., a physical address of a newly-allocated working memory machine page) is written to the working memory manager table 1116 location determined in operation 1302.

In an operation 1308, the data record from the write command is written to the newly-allocated working memory machine page of the working memory 1120.

This completes the write operation with respect to differences between how such an operation is performed in caching system 1110 (caching to working memory) versus that of caching system 110 (caching to storage cache 208).

Figure 14:
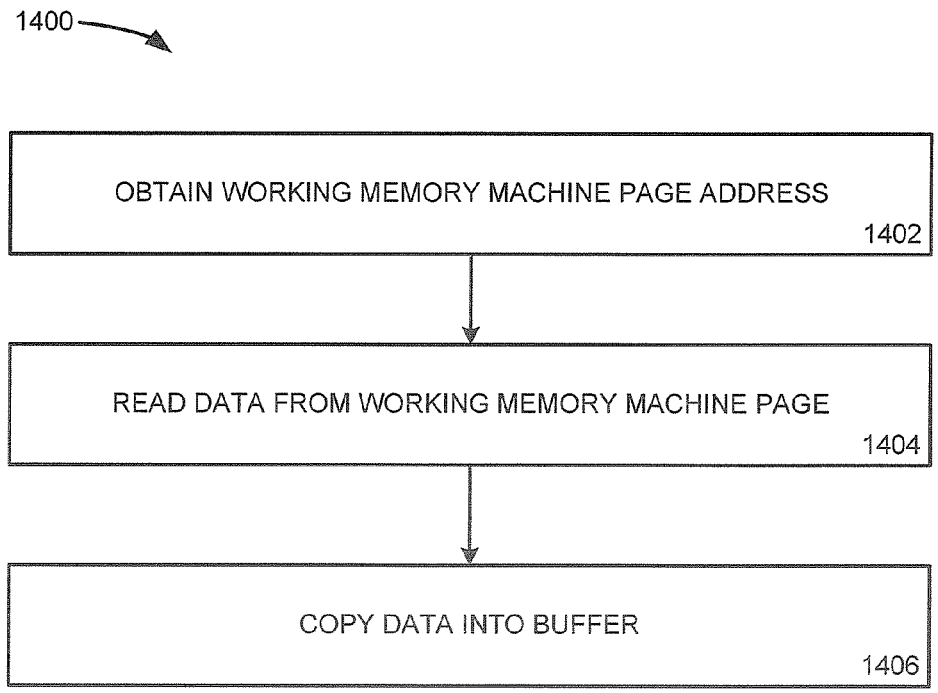
FIG. 14 is a flowchart of a method of reading data from allocated portions of working memory, according to various embodiments.

FIG. 14 is a flowchart of a method 1400 of reading from an allocated portion of working memory 1120, according to various embodiments. The method 1400 can be performed by caching system 1110 and, more particularly, by metadata manager 1104, bucket manager 1106, and working memory manager 1112, as an expansion to the processes described with reference to FIG. 6. In particular, operation 612 of FIG. 6 includes reading a record from storage cache 208 of FIG. 2. By contrast, caching system 1110 reads data from allocated portions of working memory 1120 as will now be explained.

It is to be understood that the method 1400 is ultimately initiated by, for example and as has been described elsewhere herein, receipt of a read command that causes caching system 1110 to try and read cached data and the bucket manager 1104 has obtained a bucket address from BTree 300 using a SAN offset address from the read command. However, rather than bucket manager 1104 using that bucket address to locate and access a physical memory address in contiguous memory of storage cache 208, instead, in an operation 1402, working memory manager 1112 uses the bucket address to determine a location in the working memory manager table 1116 to obtain a working memory machine page address stored there.

In an operation 1404, the working memory manager 1116 retrieves a data record stored at the working memory machine page address obtained in operation 1402.

In an operation 1406, the working memory manager 1116 writes the retrieved data record into a buffer specified by the read command (for later use/retrieval by the application issuing the read command).

This completes the read operation with respect to differences between how such an operation is performed in caching system 1110 (caching to working memory) versus that of caching system 110 (caching to storage cache 208).

Figure 15:
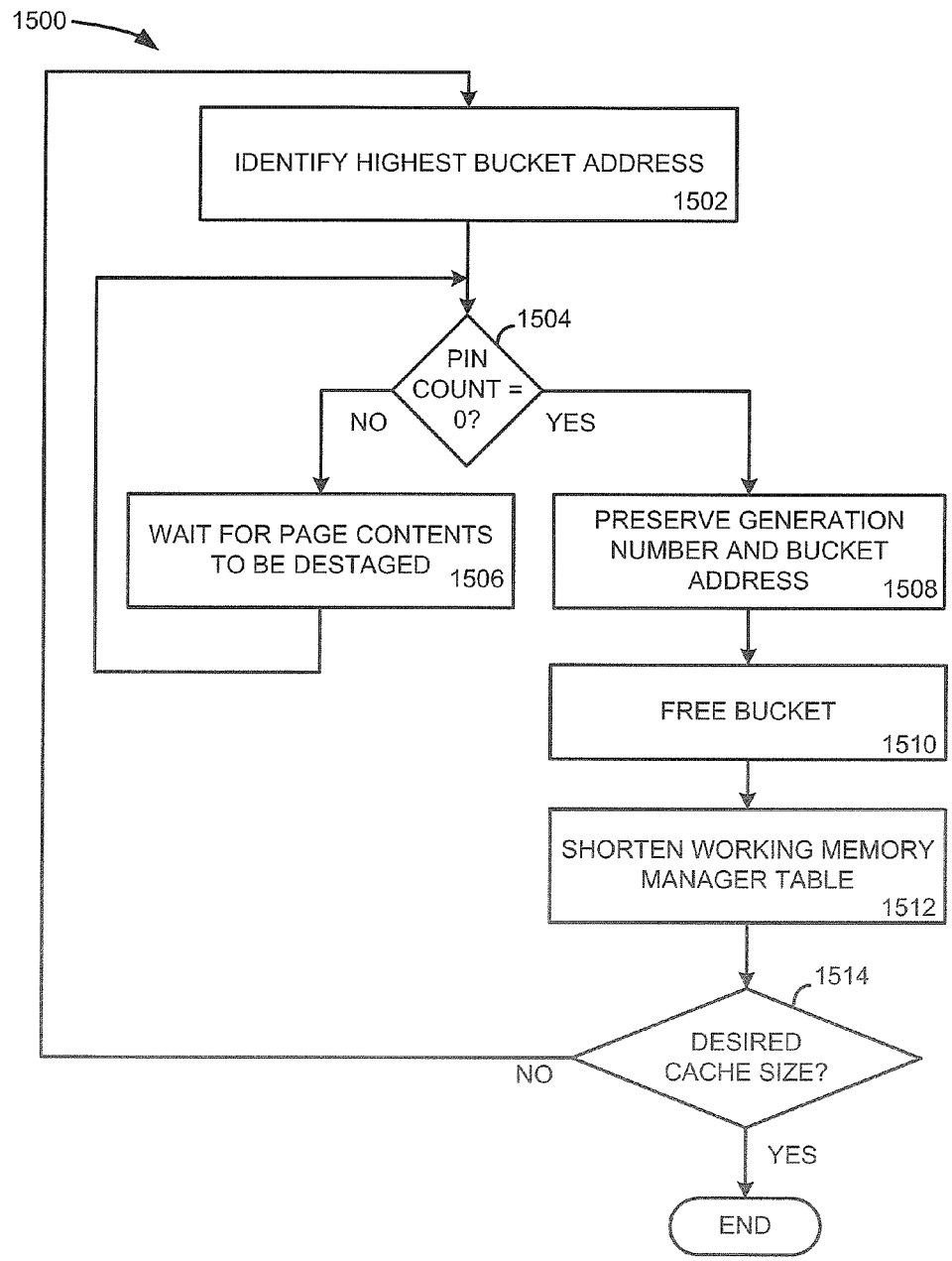
FIG. 15 is a flowchart of a method of reducing the size of the working manager memory table, according to various embodiments.

Referring now to FIG. 15 is a flowchart of a method 1500 of reducing the size of the working manager memory table 1116, according to various embodiments. Because the working manager memory table 1116 also resides in working memory of computing system 100 in some embodiments, reducing its size can make more working memory available for other purposes. It is to be understood that the method 1500 is performed in the index layer so that the allocated portions of the working memory 1120 in the data layer can be unallocated separately and independently.

In an operation 1502, the highest bucket address in the working memory manager table 1116 is identified. In some embodiments, this identification can be performed if more working memory is needed by other components of the computing system 100, on a least recently used (LRU) basis as described above, or on another basis as desired by an implementer or operator of the present approach. The operation 1502 is performed in the index layer by, for example, the metadata manager 1106.

In an operation 1504, a determination is made as to whether a pin count of the associated (to the bucket address) machine page in the allocated working memory is zero, indicating that its cached contents have been written to the storage system 112 (as was described above with reference to bucket manager 204 and bucket 314). The operation 1504 is performed in the index layer by, for example, the metadata manager 1106.

In an operation 1506, if the pin count is non-zero, method 1500 is paused or delayed until the cached contents are destaged and stored in the storage system 112. The operation 1506 is performed in the index layer by, for example, the metadata manager 1106.

In an operation 1508, if the pin count is zero, the generation number of the bucket address is stored. The operation 1508 is performed in the index layer by, for example, the metadata manager 1106.

In an operation 1510, the bucket is freed or released. As explained above, in some embodiments operation 1510 is accomplished by clearing the validation bitmap of the level two entry by setting all the values to zero. The operation 1510 is performed in the index layer by, for example, the metadata manager 1106.

In an operation 1512, the working memory manager table 1512 is shortened by one bucket length by de-allocating that portion of working manager memory table 1116, thus freeing up that portion of working memory. The operation 1512 is performed in the index layer by, for example, the metadata manager 1112.

In an operation 1514, a determination is made as to whether the cache size has been reduced to a desired level (e.g., has the working memory manager table 1116 been reduced to the desired smaller size or has enough working memory been de-allocated or made available for other use). If there are still further reductions to be made, the method 1500 returns to the operation 1502. The operation 1514 is performed in the index layer by, for example, the metadata manager 1116.

It would be understood by one of skill in the art in light of the teachings herein that, just as the size of working memory manager memory table 1116 can be reduced by de-allocating portions of working memory, the size of working manager memory table 1116 can likewise be increased by allocating additional portions of working memory for use by caching system 1110. In embodiment, this is accomplished by allocating portions of working memory that are contiguous with portions of working memory that are already allocated so as to maintain the contiguous virtual bucket address translation described and shown with reference to FIG. 12.

According to the disclosed method and apparatus, non-contiguous computing system working memory is allocated for use by a caching system and, further, an amount of working memory used to manage or index into such allocated memory can be expanded or contracted as needed or desired.

Further, it is to be understood that various operations may be performed in a difference sequence than shown and described herein without departing from the spirit and scope of the present approach.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. For example, cache indices other than BTrees and storage systems other than SANs can be used. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
receiving a first write command sent from a first virtual machine to a host operating system running on a computing system, the first write command instructing a storage system to store a first record at a first memory location;
allocating a portion of working memory of the computing system;
storing, at a first bucket address location of a working memory manager table, an address of the allocated portion of working memory;
storing the first record in the allocated portion of working memory;
storing, at a location in a cache index corresponding to the first memory location, the first bucket address and an indication that contents of the first memory location are stored in the allocated portion of working memory;
receiving a first read command sent from the first virtual machine to the host operating system, the first read command instructing the storage system to read the first memory location;
determining from the indication stored in the cache index that the contents of the first memory location are stored in the allocated portion of working memory;
obtaining the first bucket address from the cache index using the first memory location;
obtaining the address of the allocated portion of working memory from the working memory manager table using the obtained first bucket address;
reading the first record from the obtained address of the allocated portion of working memory;
determining that the first bucket address is a highest bucket address;
determining that a pin count of the allocated portion of working memory is zero;
storing a generation number of the bucket address;
clearing a validation bitmap of the bucket address in the cache index;
and,
reducing a size of the working memory manager table.

2. The method of claim 1, further comprising writing a first virtual machine identifier to a first bucket descriptor array thereby allocating the first bucket to the first virtual machine.

3. The method of claim 1, further comprising, after determining from the indication stored in the cache index that the contents of the first memory location are stored in the storage cache and before reading the first record, determining that a first bucket generation number in the first bucket address stored in the cache index matches a second bucket generation number in the first bucket address stored in a bucket manager.

4. The method of claim 1, wherein storing the first record in the allocated portion of working memory further comprises incrementing the pin count included in a first bucket descriptor array; and further comprising:

retrieving the first record from the allocated portion of working memory;

sending the first write command to the storage system; and then decrementing the pin count in the first bucket descriptor array.

5. The method of claim 4, further comprising, after decrementing the pin count:

determining that the first record as well as any other records stored in the first bucket has been sent to the storage system by confirming that the pin count in the bucket descriptor array is zero; and evicting the first bucket by incrementing a first generation number in the first bucket address stored in a bucket manager.

6. The method of claim 5, further comprising, before evicting the first bucket, determining that the first virtual machine is allocated a larger number of buckets than other virtual machines running on the computing system.

7. The method of claim 5, further comprising, before evicting the first bucket, determining that the first bucket is a least recently used (LRU) bucket of any buckets allocated to the first virtual machine.

8. The method of claim 5, further comprising writing a second virtual machine identifier to the first bucket descriptor array thereby allocating the first bucket to the second virtual machine.

9. The method of claim 5, further comprising, after evicting the first bucket:

receiving a second read command sent from the first virtual machine to the host operating system, the second read command instructing the storage system to read the first memory location;

determining that a first bucket generation number in the first bucket address stored in the cache index is different from the incremented bucket generation number included in the first bucket address stored in the bucket manager; and returning a cache miss to the first virtual machine.

10. The method of claim 1, wherein the cache index comprises a BTree having multiple levels, each BTree level corresponding to a range of memory locations with upper BTree levels subdivided into entries having a broader range of memory locations and lower BTree levels subdivided into further entries having a narrower range of memory locations.

11. The method of claim 1, further comprising, in response to receiving the first write command, tagging portions of the cache index that are traversed when determining the first memory location.

12. A system comprising:

a bucket manager configured to:

receive a first write command sent from a first virtual machine to a host operating system running on a computing system, the first write command instructing a storage system to store a first record at a first memory location, store, at a first bucket address location of a working memory manger table, an address of the allocated portion of working memory, store the first record in the allocated portion of working memory, and, a metadata manager configured to store at a location in a cache index corresponding to the first memory location, the first bucket address and an indication that contents of the first memory location are stored in the allocated portion of working memory;

wherein the bucket manager is further configured to receive a first read command sent from the first virtual machine to the host operating system, the first read command instructing the storage system to read the first memory location;

wherein the metadata manager is further configured to determine from the indication stored in the cache index that the contents of the first memory location are stored in the allocated portion of working memory;

wherein the bucket manager is further configured to:

obtain the first bucket address from the cache index using the first memory location, obtain the address of the allocated portion of working memory from the working memory manager table using the obtained first bucket address, and read the first record from the obtained address of the allocated portion of working memory, and wherein the metadata manager is further configured to:

determine that the first bucket address is a highest bucket address, determine that a pin count of the allocated portion of working memory is zero, store a generation number of the bucket address, clear a validation bitmap of the bucket address in the cache index, and, reduce a size of the working memory manager table.

13. A non-transitory computer readable medium having instructions embodied thereon, the instructions executable by one or more processors to perform operations comprising:

receiving a first write command sent from a first virtual machine to a host operating system running on a computing system, the first write command instructing a storage system to store a first record at a first memory location;

allocating a portion of working memory of the computing system;

storing, at a first bucket address location of a working memory manager table, an address of the allocated portion of working memory;

storing the first record in the allocated portion of working memory;

storing, at a location in a cache index corresponding to the first memory location, the first bucket address and an indication that contents of the first memory location are stored in the allocated portion of working memory;

receiving a first read command sent from the first virtual machine to the host operating system, the first read command instructing the storage system to read the first memory location;

determining from the indication stored in the cache index that the contents of the first memory location are stored in the allocated portion of working memory;

obtaining the first bucket address from the cache index using the first memory location;

obtaining the address of the allocated portion of working memory from the working memory manager table using the obtained first bucket address;

reading the first record from the obtained address of the allocated portion of working memory determining that the first bucket address is a highest bucket address;

determining that a pin count of the allocated portion of working memory is zero;

storing a generation number of the bucket address;

clearing a validation bitmap of the bucket address in the cache index;
and,
reducing a size of the working memory manager table.

* * * * *